US005767416A

United States Patent [19]

Conard

[11] Patent Number: 5,767,416

[45] Date of Patent: Jun. 16, 1998

[54] STRAIN GAUGE INSTALLATION TOOL

[75] Inventor: Lisa Marie Conard, Swissvale, Pa.

[73] Assignee: The United States of America as represented by the Department of Energy, Washington, D.C.

[21] Appl. No.: 788,733

[22] Filed: Jan. 23, 1997

[51] Int. Cl.$^6$ .................................................. G01N 3/02

[52] U.S. Cl. ................................ 73/856; 73/860; 81/425; 269/271

[58] Field of Search ............................ 73/856, 857, 858, 73/859, 860; 269/271, 275; 81/425

[56] References Cited

U.S. PATENT DOCUMENTS

| | | | |
|---|---|---|---|
| 2,404,224 | 7/1946 | Fink | 81/421 |
| 2,488,484 | 11/1949 | Vander Clute | 81/421 |
| 3,322,423 | 5/1967 | Popow et al. | 269/275 |
| 3,779,108 | 12/1973 | Reiter | 269/275 |
| 5,607,344 | 3/1997 | Endres | 81/421 |

*Primary Examiner*—George Dombroski
*Assistant Examiner*—Max H. Noori
*Attorney, Agent, or Firm*—John T. Lucas; William R. Moser; Paul A. Gottlieb

[57] ABSTRACT

A tool and a method for attaching a strain gauge to a test specimen by maintaining alignment of, and applying pressure to, the strain gauge during the bonding of the gauge to the specimen. The tool comprises rigid and compliant pads attached to a spring-loaded clamp. The pads are shaped to conform to the specimen surface to which the gauge is to be bonded. The shape of the pads permits the tool to align itself to the specimen and to maintain alignment of the gauge to the specimen during the bond curing process. A simplified method of attaching a strain gauge is provided by use of the tool.

9 Claims, 5 Drawing Sheets

STRAIN GAUGE INSTALLATION TOOL

This invention relates to strain gauges and more particularly to the application and bonding of strain gauges to test specimens.

BACKGROUND OF THE INVENTION

Strain gauges are used to measure the strain in material specimens when the specimens are subjected to stress. The gauges are usually bonded to the specimens with adhesives. Gauge attachment procedures may be different for different types of adhesives. For example, some adhesives require an elevated temperature to bond a gauge onto a specimen. Also, some adhesives must be applied within a limited time or the active agents will not complete the adhesion process. A uniform layer of adhesive is necessary to obtain proper bonding and reliable strain measurements. To obtain a uniform layer of an adhesive that requires curing at an elevated temperature, a constant and uniform pressure must be maintained over the gauge bonding area during the curing process. Maintaining constant and uniform pressure over the gauge area and maintaining stable gauge alignment are both essential during the curing of the adhesive.

A typical strain gauge installation assembly is a stack, or assembly, consisting of a layer of adhesive, a strain gauge, a layer of adhesive mylar or tape, a compliant pad and a rigid pad, all clamped into position on a surface of the test specimen.

In certain applications where the location of a gauge is critical, the gauge is attached to the specimen in the following manner. First, the gauge is placed face down on the adhesive surface of a thin transparent adhesive tape. Then the tape is inverted, with the gauge attached, and used to manually place the gauge face up on the surface of the specimen in the desired location. When the gauge is properly located, the adhesive surface of the tape is pressed onto the specimen to hold the gauge in place. Then, one end of the tape is peeled back to lift the gauge and expose its bottom surface. Uncured bonding adhesive is then applied between the bottom surface of the gauge and the corresponding surface of the specimen. After the bonding adhesive is applied, the tape is carefully reattached to the specimen to maintain the previous location and alignment of the gauge. Following this operation, a compliant pad is placed over the tape covering the gauge. Finally a rigid pad is placed over the compliant pad and the entire stack is clamped to the surface of the specimen for the curing of the bonding adhesive. The rigid pad usually has a surface area slightly larger than the bond area of the gauge. The compliant pad, which also has an area slightly larger than the bond area, provides a cushion between the rigid pad and the gauge. While the stack is clamped together on the specimen, the assembly is placed in a furnace (if it is necessary to heat-cure the adhesive) or the adhesive is allowed to cure at ambient temperature. When the adhesive has cured, the clamp, rigid pad, compliant pad and the tape are removed leaving only the gauge bonded to the specimen.

The process of installing strain gauges by separately applying each item in the assembly is very difficult, especially on small specimens and in multiple gauge installations. For example, a 0.250 inch diameter stud shank having four gauges mounted at 90 degree intervals around its circumference, with one diametrically opposed pair of gauges displaced axially from the other pair, presents a problem in assembling each stack while maintaining the integrity of the alignment and location of the others. The presently used methods of individually building and clamping each gauge assembly limit the accuracy and the production rates of test specimens.

SUMMARY OF THE INVENTION

The invention includes a tool, for use in attaching a strain gauge to a test specimen, which maintains alignment of, and applies pressure to the gauge during the bonding of the gauge to the test specimen.

The tool comprises a clamp, a rigid pad attached to the clamp, and a compliant pad attached to the rigid pad. The pads are formed in the shape of the specimen surface to which the strain gauge is to be bonded. By utilizing pads attached to the clamp, the separate steps of applying the compliant pad and the rigid pad to the gauge, and then maintaining alignment of the stack while applying a separate clamp, are unnecessary. By using pads having the same shape as the specimen surface, the pads are self aligning with the specimen and the stack is stable during subsequent handling and curing. Also, by using pads conforming to the specimen surface, a thinner or harder compliant pad can be used to better maintain alignment without compromising uniform pressure distribution. The installer has only to apply the adhesive, locate and align the gauge, and apply the tool before curing the adhesive.

The invention also includes a method of using the tool to quickly and easily provide for maintaining the location of, and applying uniform pressure over the bonding area to, one or more strain gauges during the bonding process.

DESCRIPTION OF THE PREFERRED EMBODIMENT

The strain gauge installation tool has integral rigid and compliant pads which enable quick and accurate gauge installation without the need to apply the pads separately. The tool allows an installer to clamp an installation assembly stack in one easy motion while maintaining the location and alignment of the gauge.

Figure 1:
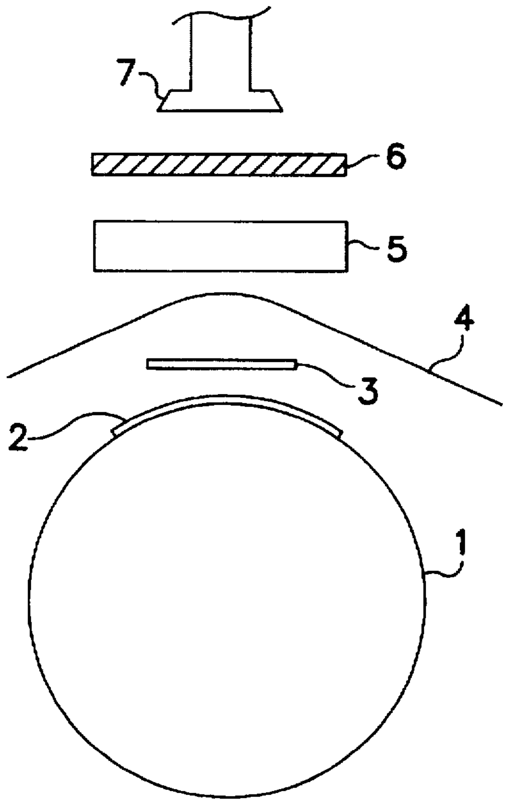
FIG. 1 is an exploded cross sectional view of the component parts used in an existing method of installing a strain gauge.

FIG. 1 shows an exploded view of a typical strain gauge installation stack. A layer of adhesive 2 is placed on specimen surface 1. Strain gauge 3 is placed on adhesive 2 and held in place by tape 4. A compliant pad 5 and a rigid pad 6 are placed over the gauge, completing the stack. In previously used processes, compliant pad 5 and rigid pad 6 were applied to the stack separately and clamped in place by a separate clamp 7. The thickness and resiliency of compliant pad 5 were chosen to allow conformance to any surface while providing acceptable pressure uniformity.

Figure 2:
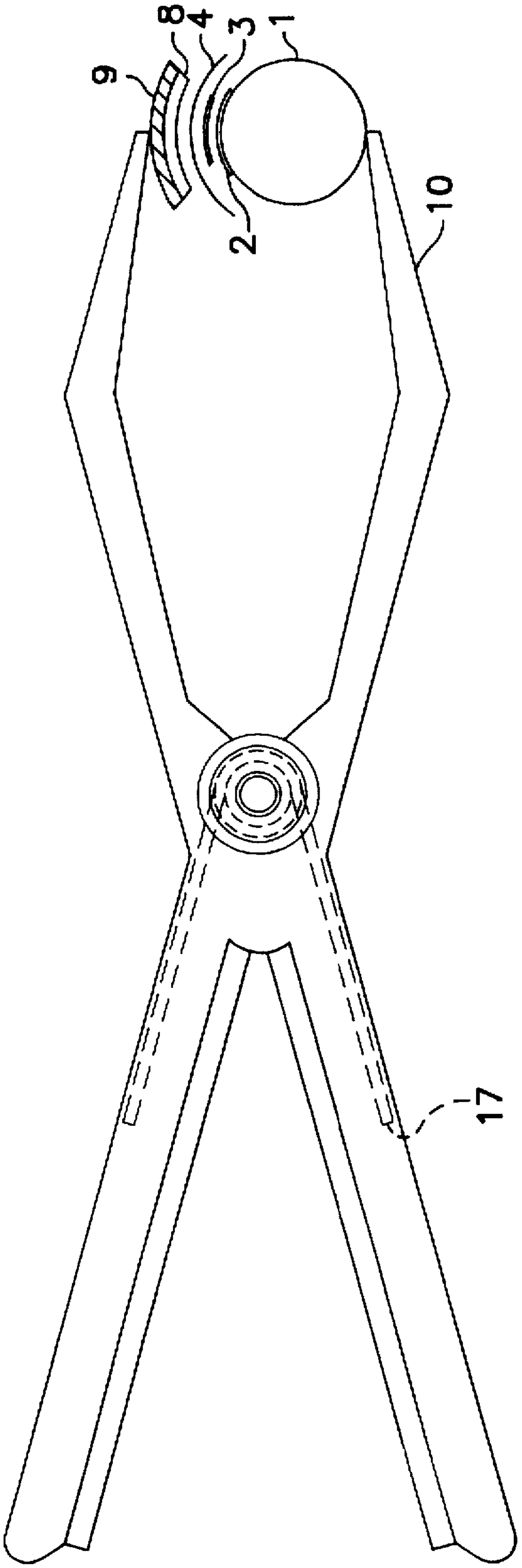
FIG. 2 is a side view of a preferred embodiment of the invention and its application to a single strain gauge on a curved surface.

FIG. 2 shows an exploded view of an installation stack utilizing the present invention. Adhesive 2, strain gauge 3, and tape 4 are applied to specimen surface 1 in the same manner as shown in FIG. 1. However, the invention includes and utilizes a tool having a compliant pad 8 attached to a rigid pad 9 which is attached to, or formed as a part of, a clamp 10. A spring 17 is enclosed within clamp 10. Pads 8 and 9 are shaped to conform to the surface contour of a bonding area on specimen surface 1. The combination of rigid pad 9 and compliant pad 8 form a pressure pad which conforms, and shapes the gauge, to the contour of the specimen surface while applying uniform pressure over the bond area. The properties of spring 17 are chosen to provide the desired pressure on the bond area. By having the pads attached to the clamp, the delicate process of maintaining alignment of the pads to the gauge while applying a separate clamp is eliminated. The elimination of the need to manually align the stack is important particularly in cases where the specimen surfaces are irregular and it is necessary to align or conform the rigid pad to the surface shape in order to obtain uniform pressure distribution over the bonding area.

When using the tool to install a strain gauge onto a specimen, gauge 3 is located and aligned using tape 4. Then a portion of tape 4 is peeled back, adhesive 2 is applied between surface 1 and gauge 3, and tape 4 is reapplied to locate gauge 3 in its original position. The preceding steps are the same as used in previous processes. However, instead of then stacking pads 5 and 6 and trying to maintain alignment while applying clamp 7 as in the previous processes, clamp 10, with the pads 8 and 9 attached, is opened, put into position over the area of gauge 3 and allowed to close under the force provided by spring 17. Then the adhesive is cured, the tool is removed, and the bonding process is complete.

The clamping operation is simplified by having clamp 10 spring-loaded into the closed position by spring 17. A spring-loaded clamp applies a constant force to the pads which is independent of the installer and also permits one-handed operation. Since pads 8 and 9 conform to the contour of the specimen surface 1, they are self aligning and apply uniform pressure to gauge 3 causing it to conform to specimen surface 1 and thereby producing and maintaining a uniform layer of adhesive 2 during the curing process.

Figure 3:
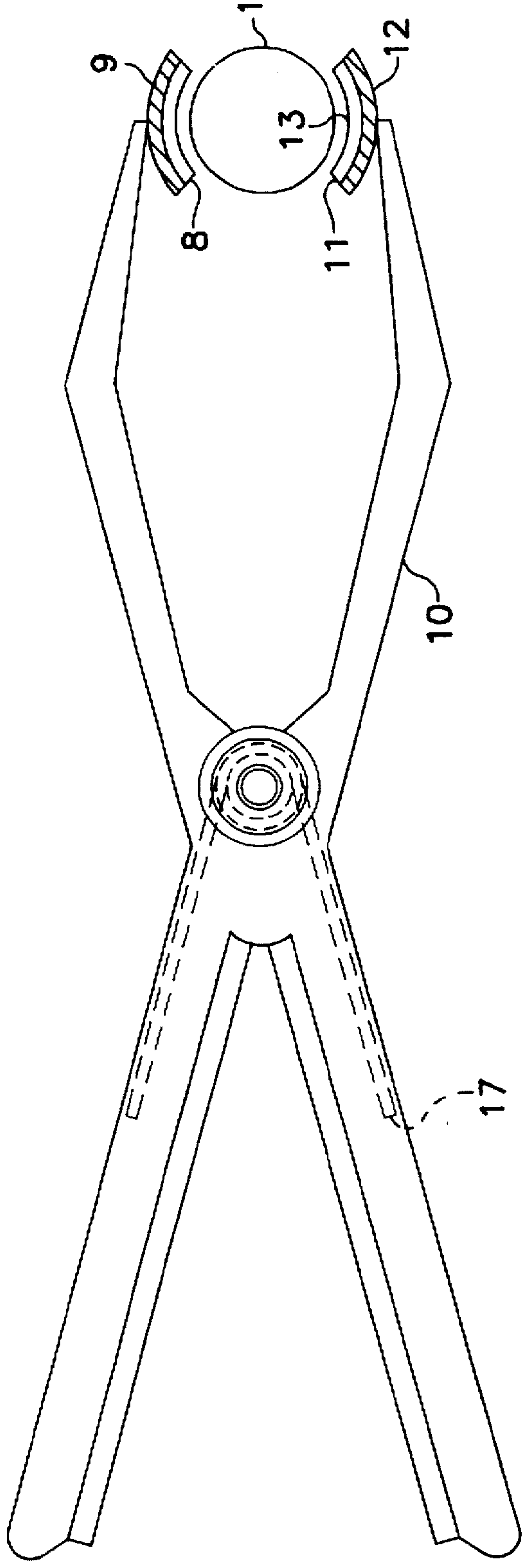
FIG. 3 is a side view of another preferred embodiment of the invention and its application to two strain gauges on two convex surfaces.
Figure 4:
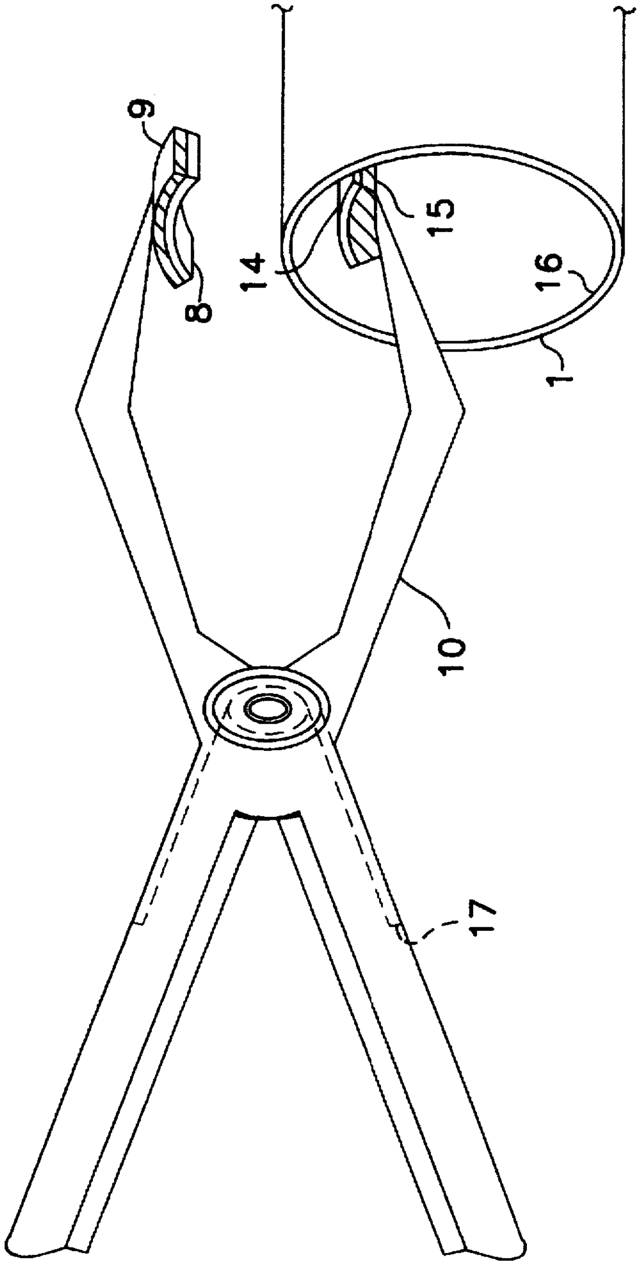
FIG. 4 is a view of still another preferred embodiment of the invention and its application to two strain gauges, one on a convex surface and one on a concave surface.

FIG. 2 shows pads 8 and 9 shaped to fit a specimen having a circular cross section. However, pads 8 and 9 can be shaped to conform to a wide variety of shapes and sizes of bonding areas and specimen surface contours. These surface contours may include flat surfaces as well as curved surfaces. Also, as shown in FIG. 3, clamp 10 can have a second set of pads, compliant pad 11 and rigid pad 12, which can be used to clamp a second installation stack to a convex specimen surface 13 opposite surface 1. Or, as shown in FIG. 4, clamp 10 can have a different set of pads, compliant pad 14 and rigid pad 15, shaped to conform to a concave specimen surface 16 opposite convex surface 1. In all these configurations, the pads can be mounted at various angles relative to clamp 10 to allow clearance between clamp 10 and the specimen. For example, the pads shown in FIG. 4 are rotated 90° from those shown in FIG. 3.

In the preferred embodiment, the rigid pads are made of metal and the compliant pads are made of silicone and are bonded to the metal pads. Also, in the preferred embodiment, the clamp has a spring-loaded scissors configuration with an internal spring. However, it should be understood that different pad materials can be used and the clamp configuration can be altered in size and shape to fit within the constraints of a particular application. For example, a clamp with more than two levers and two pressure pads could be devised to fit certain applications.

Figure 5A:
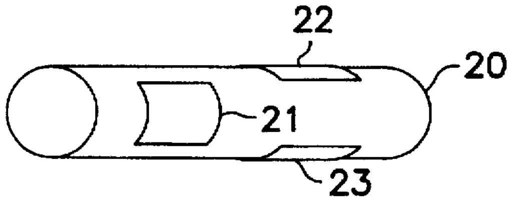
FIGS. 5A and 5B show an application in which four strain gauges are clamped to a cylindrical specimen by utilizing tools having the embodiment of FIG. 3.
Figure 5B:
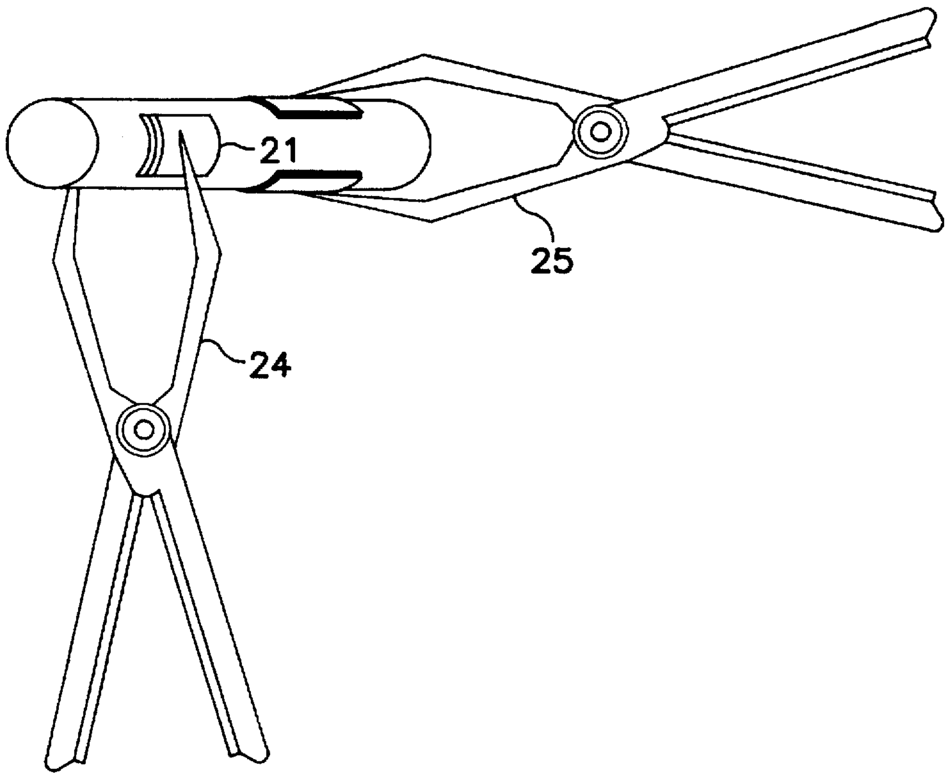

An example in which the invention is particularly useful is the one, described in the background of the invention, having the four strain gauges on the stud shank. FIG. 5A shows three (of the four described) strain gauges 21–23 located and aligned on specimen 20. FIG. 5B shows the use of two tools 24–25, having the embodiment shown in FIG. 3, to clamp the four gauges in place. Previous methods of clamping the gauges required the alignment of at least five components—two compliant pads, two rigid pads and a clamp—for each pair of gauges. The tool and method of the invention permits the same job to be done with a one-handed application of a single clamp for each pair of gauges.

While the invention has been described above with respect to a specific embodiment, it should be understood that various changes in form and detail may be made therein by a person of skill in the art without departing from the spirit and scope of the invention defined in the following claims.

I claim:

1. A tool for use in the process of bonding a strain gauge to a bonding area on a surface of a test specimen, comprising:

a clamp, which produces a force, said clamp including a spring for producing said force; and a pressure pad which comprises:

a rigid pad, attached to said clamp, having a surface area for distributing said force over the bonding area, and a compliant pad, comprising silicon, attached to said surface area of said rigid pad, for providing a more uniform distribution of said force over the bonding area.

2. The tool of claim 1, wherein said pressure pad is shaped to conform to the surface of the test specimen in the bonding area.

3. A tool for use in the process of bonding a strain gauge to a bonding area on a surface of a test specimen, comprising:

a clamp, which comprises:

a first lever, a second lever, a pivot, said pivot connecting said first and second levers in a scissors configuration, and a spring for producing a force; and a pressure pad shaped to conform to the surface of the test specimen in the bonding area, which comprises:

a rigid pad, attached to said first lever, having a surface area for distributing said force over the bonding area, and a compliant pad comprising silicon, attached to said surface area of said rigid pad, for providing a more uniform distribution of said force over the bonding area.

4. The tool of claim 1, wherein said rigid pad is made of metal.

5. A tool for use in the process of bonding a first and a second strain gauge to a first and a second bonding area on a surface of a test specimen, comprising:

a clamp, which comprises:

a first lever, a second lever, a pivot, said pivot connecting said first and second levers in a scissors configuration, and a spring for producing a force;

a first pressure pad shaped to conform to the surface of the test specimen in the first bonding area, which comprises:

a first rigid pad, attached to said first lever, having a first surface area for distributing said force over the first bonding area, and a first compliant pad comprising silicon, attached to said first surface area of said first rigid pad, for providing a more uniform distribution of said force over the first bonding area; and a second pressure pad shaped to conform to the surface of the test specimen in the second bonding area, which comprises:

a second rigid pad, attached to said second lever, having a second surface area for distributing said force over the second bonding area, and a second compliant pad comprising silicon, attached to said second surface area of said second rigid pad, for providing a more uniform distribution of said force over the second bonding area.

6. The tool of claim 1, wherein said clamp includes a first lever, a second lever and a pivot, said pivot connecting said first and second levers in a scissors configuration, and wherein said pressure pad is attached to said first lever.

7. The tool of claim 6, wherein said pressure pad is shaped to conform to the surface of the test specimen in the bonding area.

8. The tool of claim 1, further comprising a second pressure pad, attached to said clamp, for applying pressure to a second strain gauge on a second bonding area on the surface of the specimen.

9. The tool of claim 8, wherein each of said pressure pads is shaped to conform to the surface of the test specimen in one of the bonding areas.

* * * * *